(12) United States Patent
Kang

(10) Patent No.: US 11,970,130 B2
(45) Date of Patent: Apr. 30, 2024

(54) PILLAR ANCHOR FOR AUTOMOBILE AND METHOD FOR MANUFACTURING SAME

(71) Applicant: KUMTOIL INDUSTRIAL CO., LTD., Siheung-si (KR)

(72) Inventor: Jin Hee Kang, Seoul (KR)

(73) Assignee: KUMTOIL INDUSTRIAL CO., LTD. (KR)

( * ) Notice: Subject to any disclaimer, the term of this patent is extended or adjusted under 35 U.S.C. 154(b) by 0 days.

(21) Appl. No.: 17/908,909

(22) PCT Filed: Feb. 26, 2021

(86) PCT No.: PCT/KR2021/002459
§ 371 (c)(1),
(2) Date: Sep. 1, 2022

(87) PCT Pub. No.: WO2021/177672
PCT Pub. Date: Sep. 10, 2021

(65) Prior Publication Data
US 2023/0088116 A1    Mar. 23, 2023

(30) Foreign Application Priority Data

Mar. 4, 2020  (KR) .......................... 10-2020-0026924

(51) Int. Cl.
*B60R 22/24* (2006.01)
*B21D 22/26* (2006.01)
(Continued)

(52) U.S. Cl.
CPC .............. *B60R 22/24* (2013.01); *B21D 22/26* (2013.01); *B23K 11/002* (2013.01); *B23K 11/11* (2013.01);
(Continued)

(58) Field of Classification Search
CPC ......... B60R 22/24; B60R 22/18; B21D 22/26; B21D 22/20
See application file for complete search history.

(56) References Cited

U.S. PATENT DOCUMENTS

| | | | |
|---|---|---|---|
| 2005/0012321 A1* | 1/2005 | Moendel | B60R 22/18 |
| | | | 280/808 |
| 2005/0017498 A1* | 1/2005 | Kang | B21D 35/00 |
| | | | 280/808 |
| 2007/0040372 A1 | 2/2007 | Tabata et al. | |

FOREIGN PATENT DOCUMENTS

| | | |
|---|---|---|
| DE | 10051014 C1 | 5/2002 |
| DE | 102006028892 A1 | 12/2007 |

(Continued)

OTHER PUBLICATIONS

International Search Report for PCT/KR2021/002459 dated Jun. 15, 2021.

(Continued)

*Primary Examiner* — Jason L Vaughan
*Assistant Examiner* — Amanda Kreiling
(74) *Attorney, Agent, or Firm* — Renaissance IP Law Group LLP

(57) ABSTRACT

Disclosed are a pillar anchor for an automobile and a method of manufacturing the same. According to an embodiment of the disclosure, the pillar anchor for an automobile includes a pair of first and second anchor plates including metal, integrated in one body, and guiding a movement of a seat belt of a vehicle, wherein each of the first and second anchor plates includes a belt movement guide recess portion protruding toward one side of the first and second anchor plates through drawing processing, and guiding the movement of the seat belt, and a reinforcement flange formed at edge (Continued)

portions of the first and second anchor plates to reinforce the first and second anchor plates.

14 Claims, 14 Drawing Sheets

(51) Int. Cl.
  *B23K 11/00* (2006.01)
  *B23K 11/11* (2006.01)
  *B23P 15/00* (2006.01)
  *B60R 11/00* (2006.01)
  *B60R 22/18* (2006.01)

(52) U.S. Cl.
  CPC ............ *B23P 15/00* (2013.01); *B23P 2700/50* (2013.01); *B60R 2011/0022* (2013.01); *B60R 2011/0031* (2013.01); *B60R 2022/1818* (2013.01); *B60Y 2200/91* (2013.01)

(56) References Cited

FOREIGN PATENT DOCUMENTS

| | | |
|---|---|---|
| JP | 3021403 B2 | 3/2000 |
| JP | 2005035540 A | 2/2005 |
| JP | 2005041458 A | 2/2005 |
| JP | 2007050824 A | 3/2007 |
| JP | 2011218254 A | 11/2011 |
| JP | 2017159902 A | 9/2017 |
| KR | 100599881 B1 | 7/2006 |
| KR | 20110001731 A | 1/2011 |

OTHER PUBLICATIONS

European Extended Search Report for Application No. 21764326.1, dated Jul. 28, 2023.

* cited by examiner

US 11,970,130 B2

PILLAR ANCHOR FOR AUTOMOBILE AND METHOD FOR MANUFACTURING SAME

TECHNICAL FIELD

The present inventive concept relates to a pillar anchor for an automobile and a method of manufacturing the same, and more particularly, to a pillar anchor for an automobile which may be easily manufactured in a simple structure compared with the related art, and may exhibit high durability and light weight so as to be easily applied to vehicles, such as electric vehicles and the like, requiring lightweight parts, and a method of manufacturing the same.

BACKGROUND ART

Seat belts or called safety belts are used for safety of vehicle occupants.

A seat belt 40, as illustrated in FIG. 1, has a structure of being wound when not worn by a user and released from a wound state when pulled by the user for wearing. The seat belt 40 intends to protect a driver or occupant safe from a very strong shock that is instantaneously applied to the driver or occupant in a vehicle collision or bump.

An installation structure of the seat belt 40 is briefly described with reference to FIG. 1. One end of a connection belt 20 is fixed by a first mini-anchor 70 at one lower side of a body panel 90 of a vehicle seat D. A buckle 10 is provided at the other end of the connection belt 20.

A retractor 30 is fixed to one side surface of the body panel 90. A pillar anchor 60 is installed above the retractor 30. For reference, although the pillar anchor 60 may be referred to as a D ring, in the following description, it will be referred to as the pillar anchor 60.

The pillar anchor 60 forms a place where the seat belt 40 is rotatably installed. The seat belt 40 has one end that is coupled to the retractor 30. A coupling device 50 is provided at one side of the seat belt 40. The coupling device 50 is detachably coupled to the buckle 10.

The other end of the seat belt 40 is fixed to a second mini-anchor 80 fixed to the body panel 90 at the opposite side of the first mini-anchor 70 with the seat D therebetween.

The structure as in FIG. 1 is a general structure for installing the seat belt 40 in a vehicle, and in the structure described above, the pillar anchor 60 is provided as a support for the seat belt 40. The pillar anchor 60 is fixedly installed at one upper side of the body panel 90, and intends to support the seat belt 40 passing through the inside thereof. Accordingly, the pillar anchor 60 requires high durability to stably support the seat belt 40.

However, in the case of the existing pillar anchors including the pillar anchor 60 of FIG. 1, as the pillar anchors are manufactured in a complex structure or method for high durability, manufacturing the pillar anchors is not easy and manufacturing costs are increased, and in particular, the existing pillar anchors having high weight do not match the recent trend that requires weight reduction of parts in electric vehicles or lightweight vehicles.

In particular, as the existing pillar anchor 60 is manufactured by primarily processing a thick iron plate and then secondarily insert-injecting synthetic resin, manufacturing the pillar anchors is not easy and manufacturing costs are increased. Furthermore, considering a declining trend in the injection molding due to environmental issues, there is a demand for a pillar anchor for an automobile according to a new concept that is not previously known.

DETAILED DESCRIPTION OF THE INVENTIVE CONCEPT

Technical Problem

Provided is a pillar anchor for an automobile which may be easily manufactured in a simple structure compared with the related art, and may exhibit high durability and light weight so as to be easily applied to vehicles, such as electric vehicles and the like, requiring lightweight parts, and a method of manufacturing the same.

Advantageous Effects

According to the present inventive concept, a pillar anchor for an automobile may be easily manufactured in a simple structure compared with the related art, and may exhibit high durability and light weight so as to be easily applied to vehicles, such as electric vehicles and the like, requiring lightweight parts.

According to the present inventive concept, as a reinforcement flange is provided in a pillar anchor for an automobile to serve as a strong support, in a vehicle collision or bump, a pillar anchor for an automobile is not deformed by a very strong shock and can stably support a seat belt, and as a result, a driver or occupant may be safely protected.

BEST MODE

Figure 1:
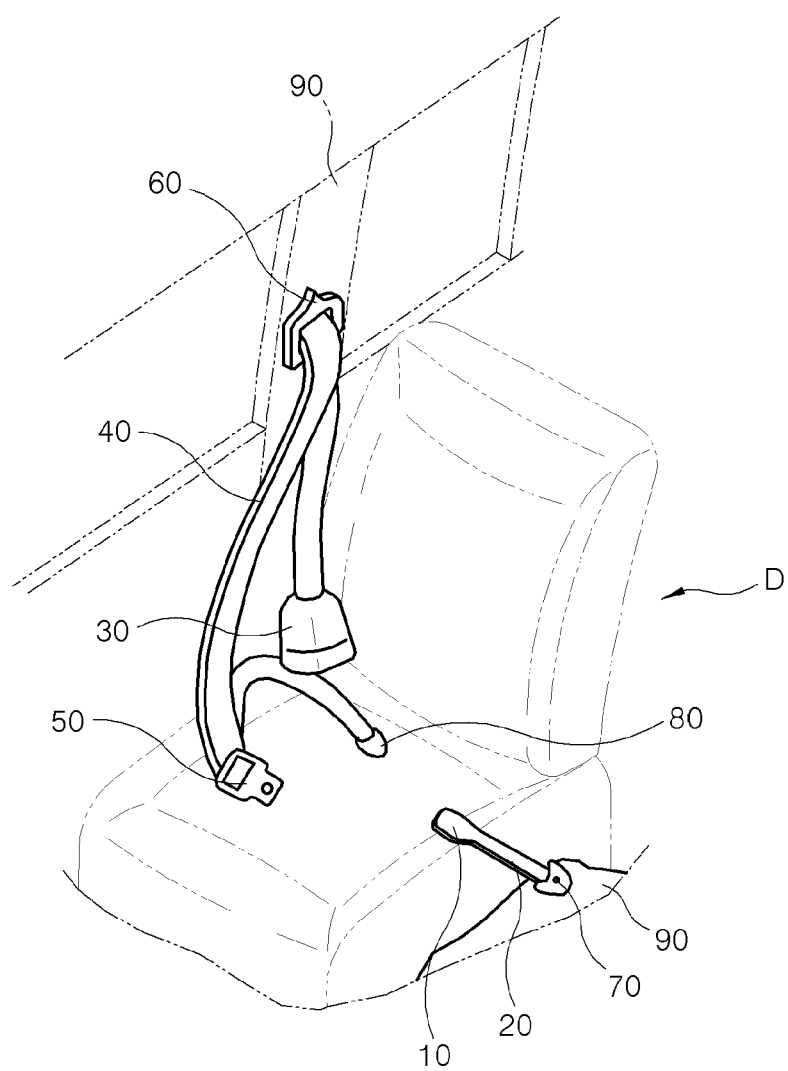
FIG. 1 is a view illustrating a vehicle seat belt installation structure.

According to an aspect of the present inventive concept, the pillar anchor for an automobile includes a pair of first and second anchor plates including metal, integrated in one body, and guiding a movement of a seat belt of a vehicle, wherein each of the first and second anchor plates includes a belt movement guide recess portion protruding toward one side of the first and second anchor plates through drawing processing, and guiding the movement of the seat belt, and a reinforcement flange formed at edge portions of the first and second anchor plates to reinforce the first and second anchor plates.

The reinforcement flange may be continuously arranged along an outer perimeter of the belt movement guide recess portion.

The belt movement guide recess portion may have an oval structure of a closed loop.

The belt movement guide recess portion may have an open type oval structure with one open side and an open portion may be formed in one side of the belt movement guide recess portion.

The first and second anchor plates may include iron plates and each of the iron plates has high tensile steel for a vehicle structure, and the first and second anchor plates may be formed in one body by welding.

A temporarily assembled portion may be provided in the first and second anchor plates to temporarily assemble the first and second anchor plates before the first and second anchor plates are welded.

The temporarily assembled portion may include at least one temporarily assembled protrusion provided on one of the first and second anchor plates, and a temporarily assembled hole provided in the other of the first and second anchor plates, and temporarily assembled with a temporarily assembled protrusion at an opposite side.

A plurality of welding bead portions, each having a sharp tip end, may be formed on at least any one of the first and second anchor plates.

In both of the first and second anchor plates, a belt passing hole, through which the seat belt passes, may be formed inside the belt movement guide recess portion to penetrate the belt movement guide recess portion, and a through-hole may be formed at one side of the belt movement guide recess portion, and a belt guide rib for preventing inversion of the seat belt may protrude in an area of the belt passing hole in at least any one of the first and second anchor plates.

According to another aspect of the present inventive concept, a method of manufacturing a pillar anchor for an automobile includes an anchor plate preparation operation of preparing first and second anchor plates that are materials of the pillar anchor for an automobile, the material including metal, and a drawing processing operation of drawing processing each of the first and second anchor plates to process a belt movement guide recess portion for guiding a movement of a seat belt of a vehicle connected to the a pillar anchor for an automobile, wherein, when the drawing processing operation is performed, a reinforcement flange for reinforcement of the first and second anchor plates is formed at edge portions of the first and second anchor plates outside the belt movement guide recess portion.

In the first and second anchor plates, the reinforcement flange may be continuously arranged along an outer perimeter of the belt movement guide recess portion.

The method may further include, after performing the drawing processing operation, a barrel polishing operation of barrel polishing each of the first and second anchor plates that have been drawing-processed, to remove burr generated in the drawing processing operation.

The method may further include, after performing the barrel polishing operation, a welding operation of welding a pair of the first and second anchor plates that have been barrel-polished and contact each other.

The method may further include, before or after performing the drawing processing operation, an anchor plate additional processing operation of performing additional processing to form a belt passing hole, through which the seat belt passes, in the pair of the first and second anchor plates, while processing a temporarily assembled protrusion on the first anchor plate of the pair of the first and second anchor plates that have been drawing-processed and processing a temporarily assembled hole in the second anchor plate.

The method may further include, before performing the welding, a temporarily assembling operation of temporarily assembling the pair of the first and second anchor plates by using a temporarily assembled portion formed in the pair of the first and second anchor plates that have been barrel-polished.

The method may further include a surface-contact region finishing processing operation of manufacturing the pillar anchor for an automobile by finishing-processing a surface-contact region of the pair of the first and second anchor plates that have been welded in one body.

Mode of the Inventive Concept

In order to fully understand the operational advantages of the present inventive concept and the objectives achieved by the implementation of the present inventive concept, the accompanying drawings illustrating preferred embodiments of the present inventive concept and the contents described in the accompanying drawings are referred to.

Hereinafter, the inventive concept will be described in detail by explaining preferred embodiments of the inventive concept with reference to the attached drawings. Like reference numerals in the drawings denote like elements.

Figure 2:
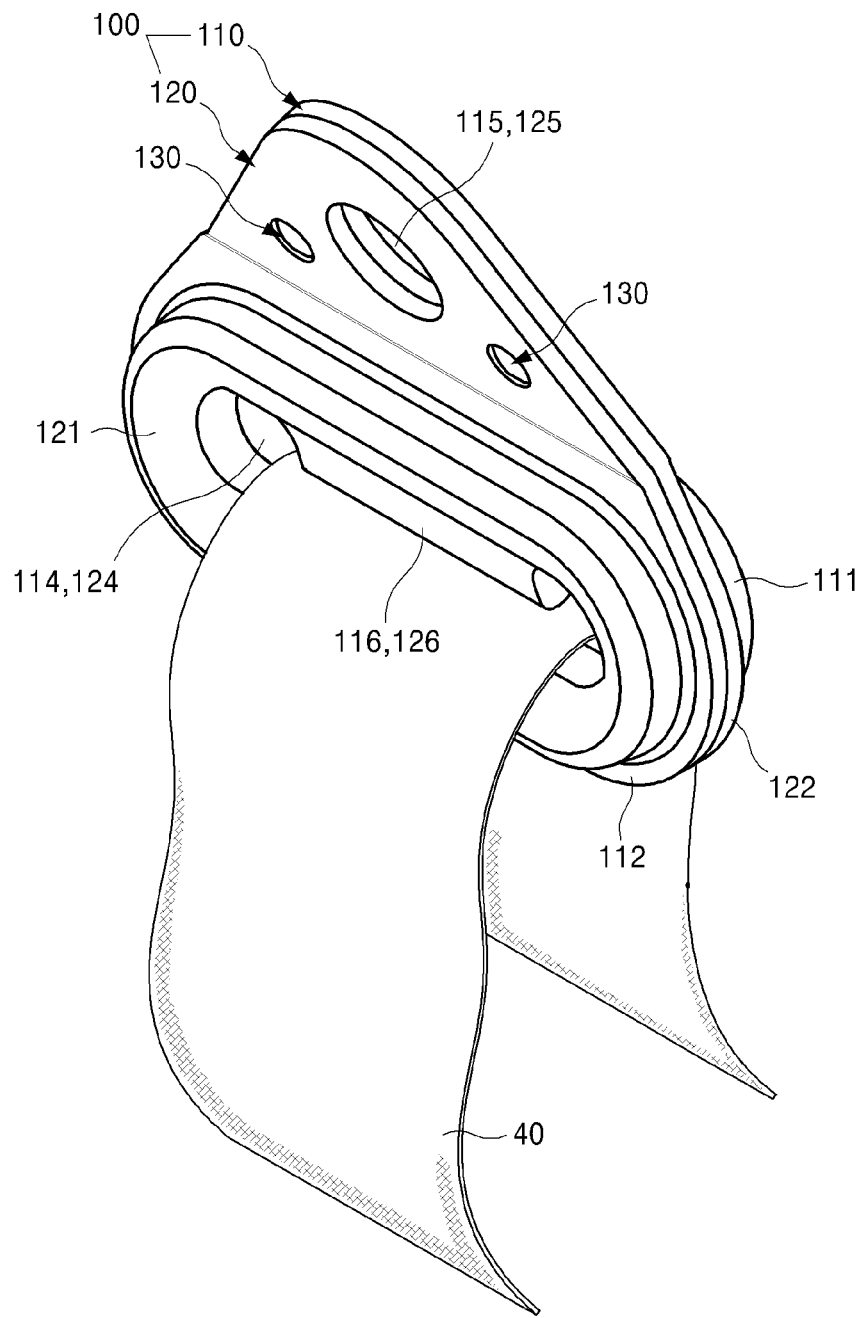
FIG. 2 is a perspective view illustrating a use state of a pillar anchor for an automobile, according to a first embodiment of the present inventive concept.
Figure 3:
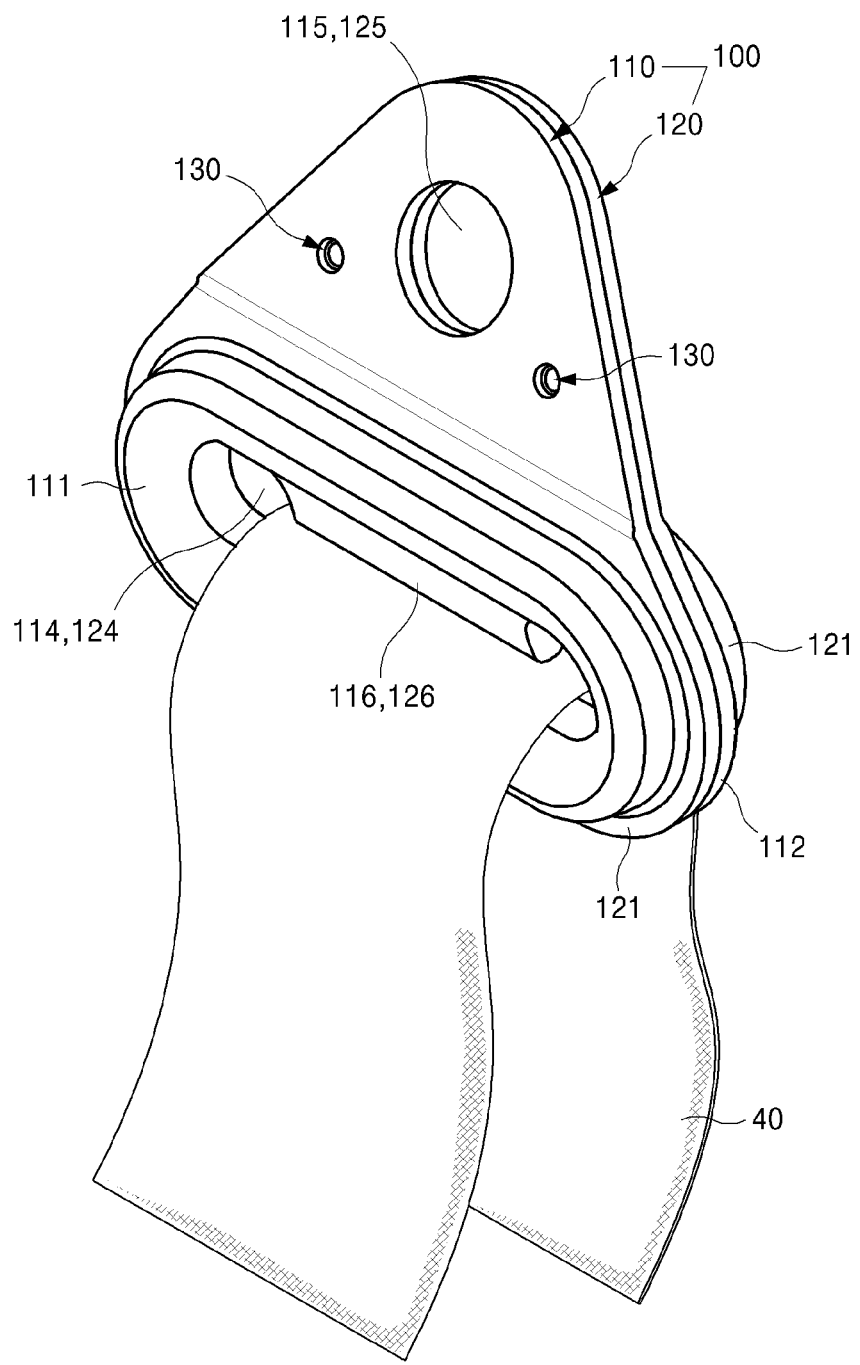
FIG. 3 is a perspective view of the rear side of FIG. 2.
Figure 4:
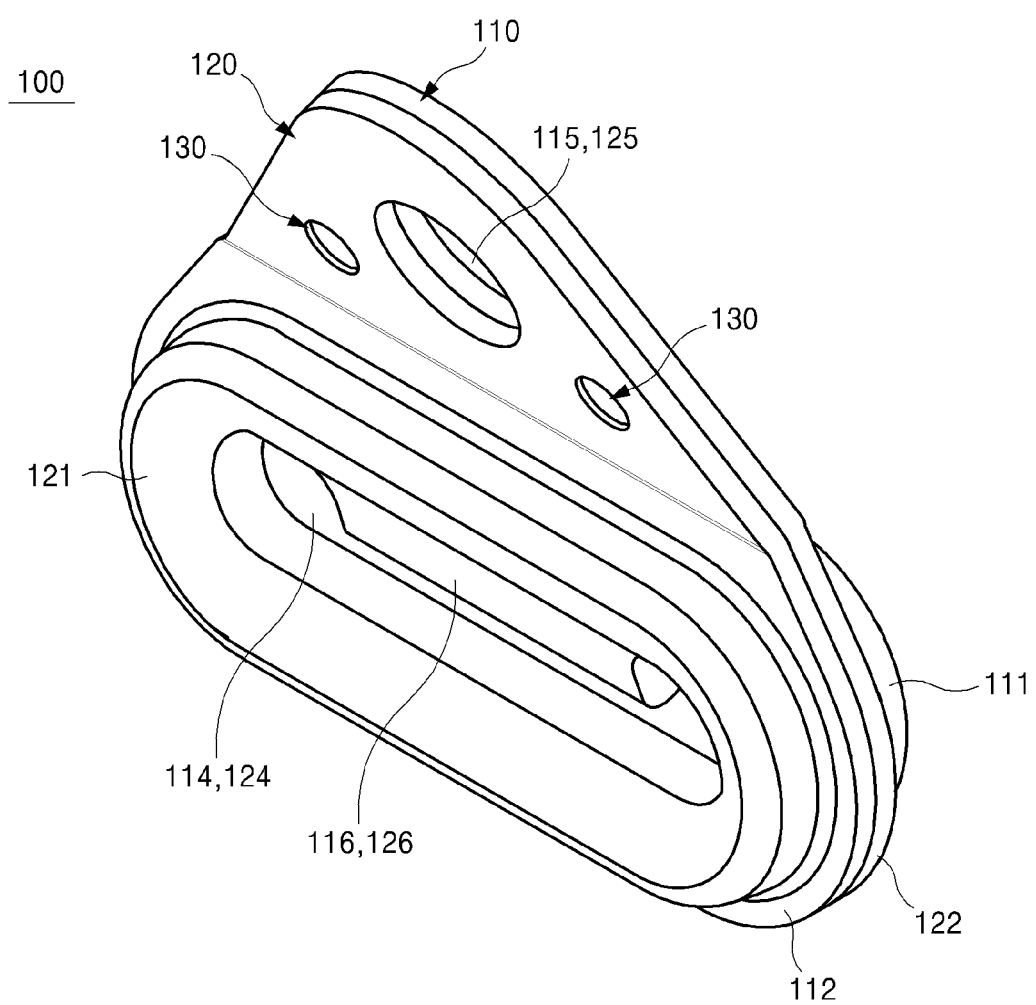
FIG. 4 is a perspective view of the pillar anchor for an automobile of FIG. 2 in which a seat belt is removed.
Figure 5:
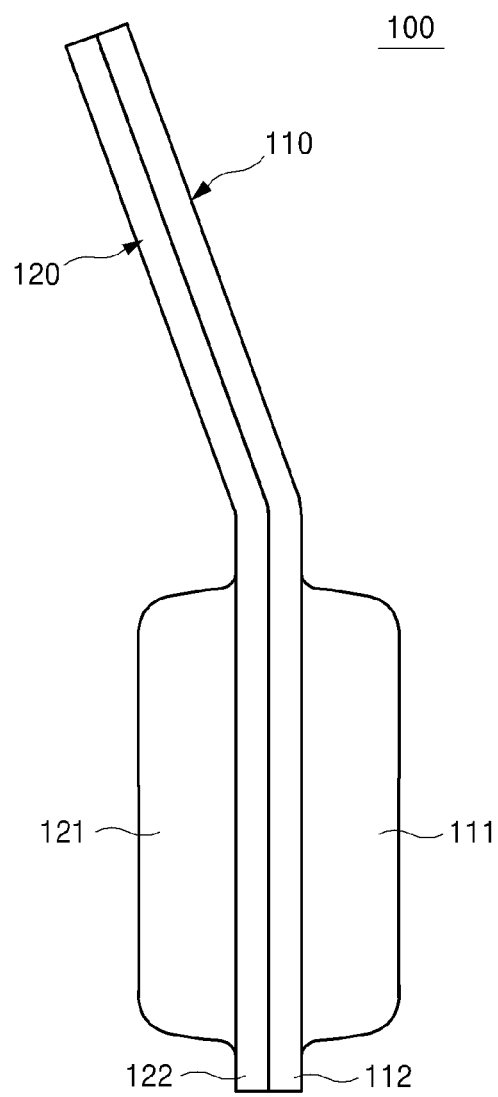
FIG. 5 is a side view of FIG. 4.
Figure 6:
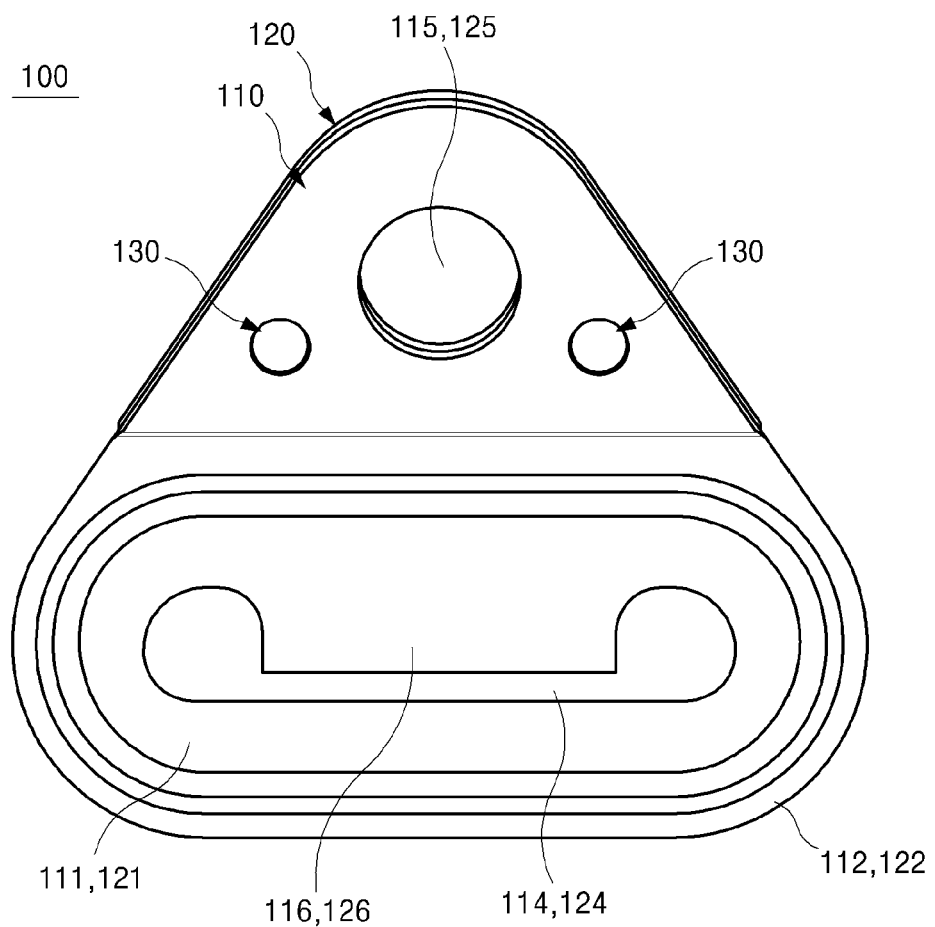
FIG. 6 is a front view of FIG. 4.
Figure 7:
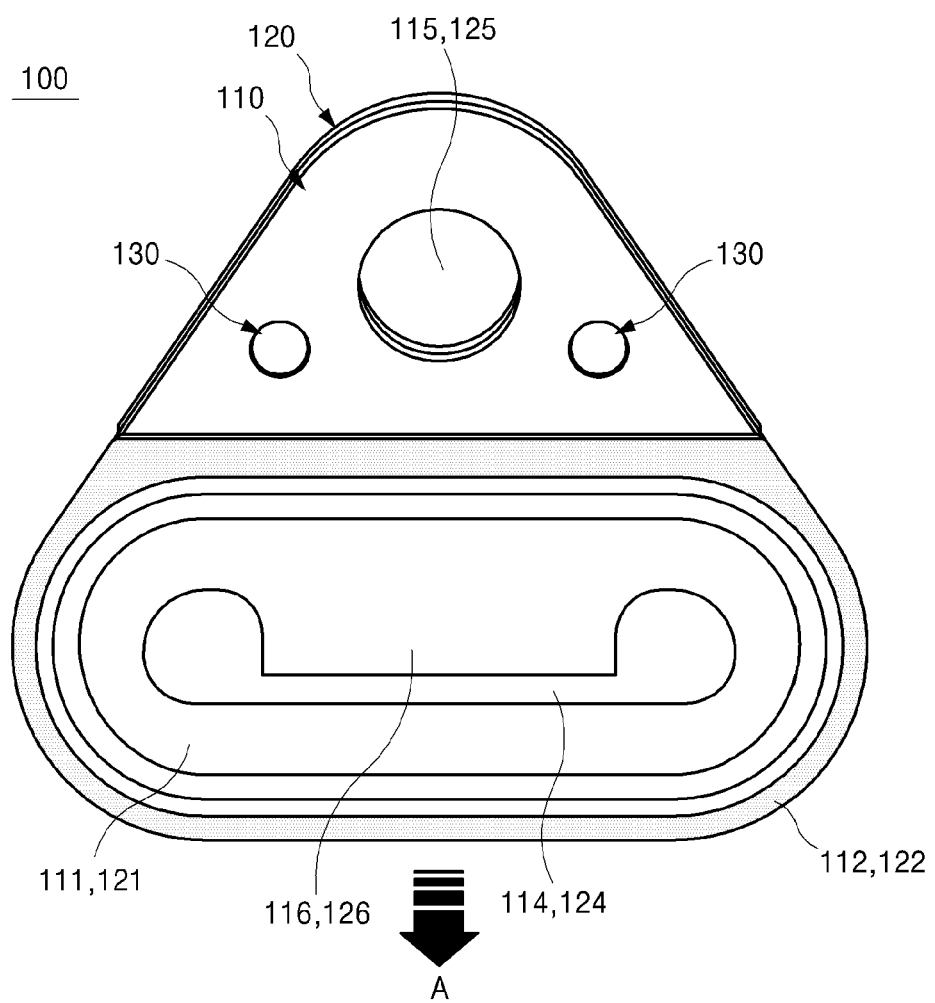
FIG. 7 illustrates a reinforcement flange hatched to emphasize the reinforcement flange in FIG. 6.
Figure 8:
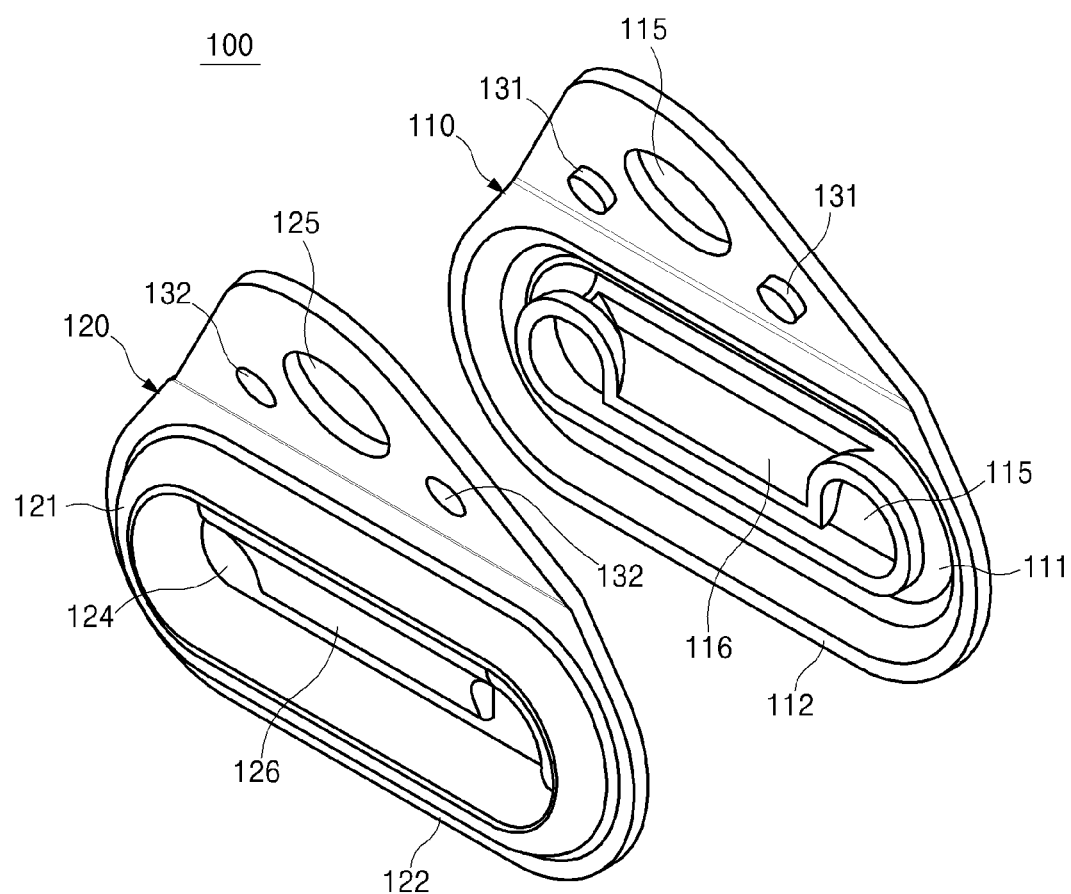
FIG. 8 is an exploded perspective view of FIG. 4.
Figure 9:
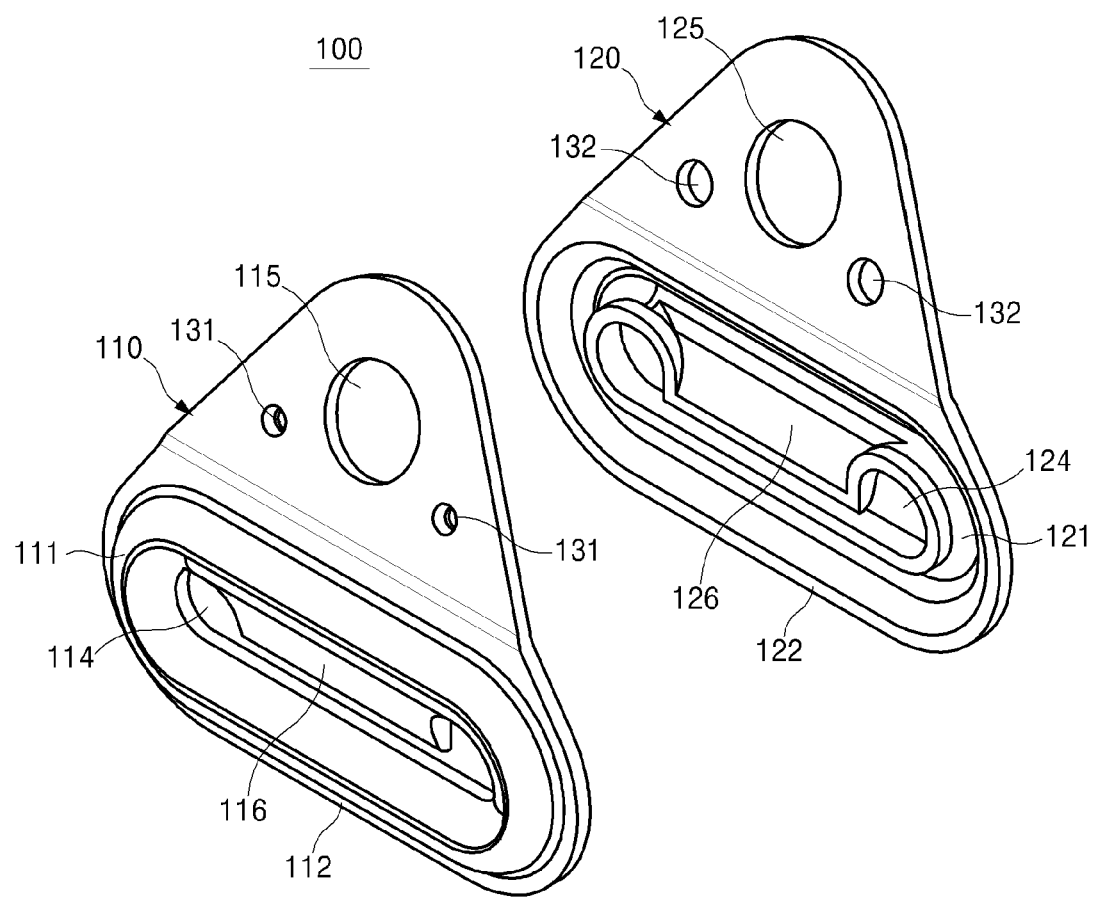
FIG. 9 is a perspective view of the rear side of FIG. 8.
Figure 10:
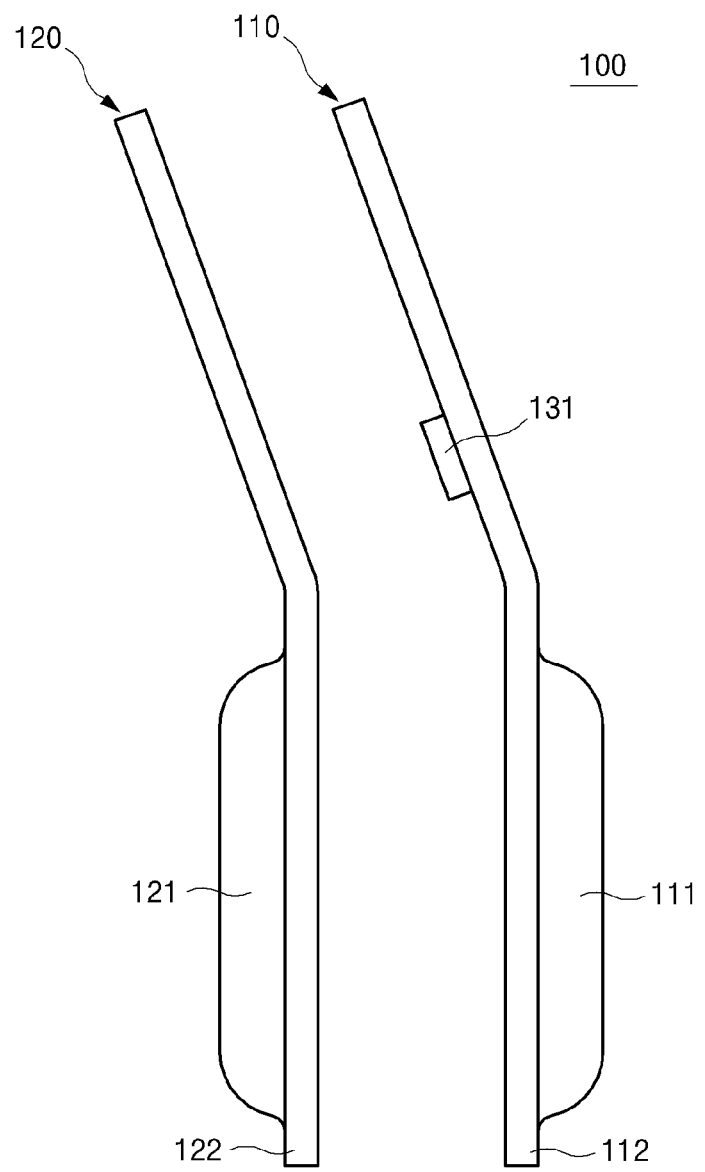
FIG. 10 is a side view of FIG. 8.
Figure 11:
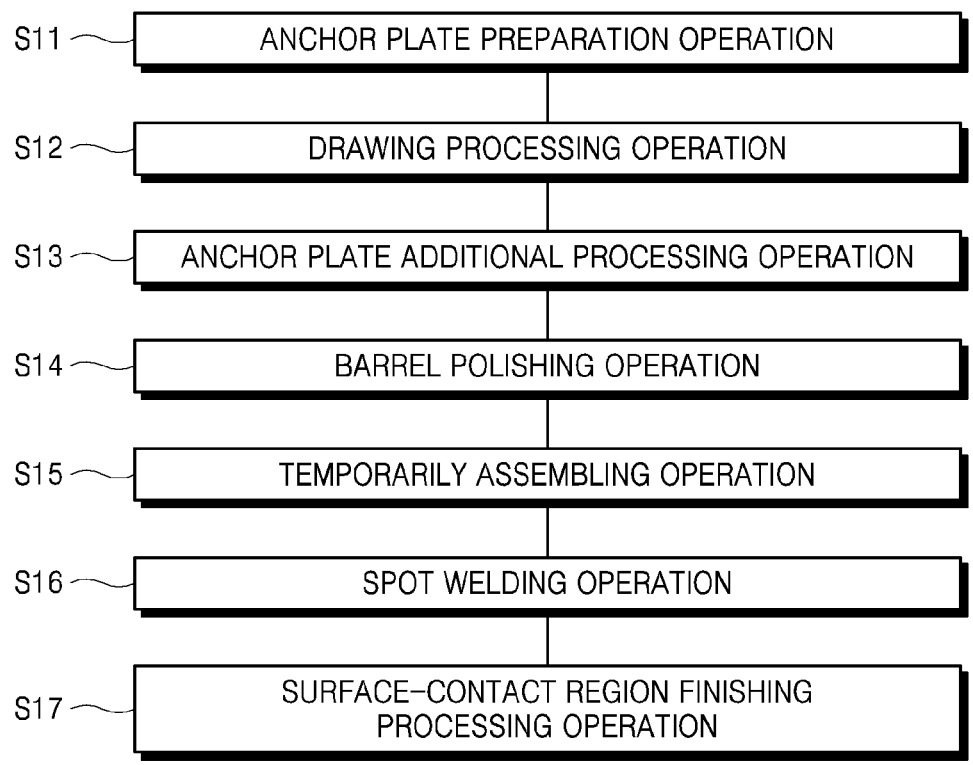
FIG. 11 is a flowchart of a method of manufacturing the pillar anchor for an automobile of FIG. 2.

FIG. 2 is a perspective view illustrating a use state of a pillar anchor for an automobile, according to a first embodiment of the present inventive concept, FIG. 3 is a perspective view of the rear side of FIG. 2, FIG. 4 is a perspective view of the pillar anchor for an automobile of FIG. 2 in which a seat belt is removed, FIG. 5 is a side view of FIG. 4, FIG. 6 is a front view of FIG. 4, FIG. 7 illustrates a reinforcement flange hatched to emphasize the reinforcement flange in FIG. 6, FIG. 8 is an exploded perspective view of FIG. 4, FIG. 9 is a perspective view of the rear side of FIG. 8, FIG. 10 is a side view of FIG. 8, and FIG. 11 is a flowchart of a method of manufacturing the pillar anchor for an automobile of FIG. 2.

Referring to the above drawings, a pillar anchor 100 for an automobile, according to the present embodiment may be easily manufactured in a simple structure compared with the related art and may exhibit high durability and light weight. Accordingly, the pillar anchor 100 may be easily applied to electric vehicles and the like requiring lightweight parts.

In particular, reinforcement flanges 112 and 122 are provided in the pillar anchor 100 for an automobile, according to the present embodiment, to serve as a strong support, as described below, and thus, in a vehicle collision or bump, the pillar anchor 100 for an automobile may not be deformed even by a very strong shock and the seat belt 40 may be stably supported, thereby protecting a driver or occupant safe.

The pillar anchor 100 for an automobile, according to the present embodiment providing the above effect may include a pair of first and second anchor plates 110 and 120. Although the first and second anchor plates 110 and 120 are individually manufactured, the first and second anchor plates 110 and 120 may be integrally welded, through welding, forming one body.

The pillar anchor 100 for an automobile according to the present embodiment in which the first and second anchor plates 110 and 120 are welded into one body is mounted on a vehicle in the method of FIG. 1 and guides the movement of a seat belt 40 of a vehicle. In other words, when wearing the seat belt 40, the seat belt 40 is pulled, and when taking off the seat belt 40, the seat belt 40 is released to the original state, in which the pillar anchor 100 for an automobile, according to the present embodiment is in charge of the above movements of the seat belt 40.

As the seat belt 40 is one of important safety devices in a vehicle, to support the seat belt 40 and stably guide the seat belt 40, durability of the pillar anchor 100 for an automobile, that is, the pillar anchor 100 for an automobile including the first and second anchor plates 110 and 120, which guides the movement of the seat belt 40, is necessarily high.

However, when the pillar anchor 100 for an automobile is manufactured in a complex structure or method according to the related art, for example, by primarily processing a thick iron plate and then secondarily insert-injecting synthetic resin, a process may be complicated and manufacturing costs may be necessarily increased, in particular, weight is necessarily increased, which does not match the recent trend that requires weight reduction of parts in electric vehicles.

In particular, considering a declining trend in the injection molding due to environmental issues, it may be an optimal method to manufacture the pillar anchor 100 for an automobile by individually manufacturing the first and second anchor plates 110 and 120 with metal, and making the first and second anchor plates 110 and 120 one body by welding, as in the present embodiment.

However, when the first and second anchor plates 110 and 120 are manufacture and welded in a simple shape only, a desired structure strength may not be provided, and thus, the first and second anchor plates 110 and 120 are manufactured to have the following structural feature.

In the present embodiment, both of the first and second anchor plates 110 and 120 are manufactured to have the same structure, except a temporarily assembled portion 130, that is, the configuration of the temporarily assembled portion 130 to temporarily assemble the first and second anchor plates 110 and 120 before welding the first and second anchor plates 110 and 120. Accordingly, convenience may be increased in a manufacturing process.

The structures of the first and second anchor plates 110 and 120 are described. The first and second anchor plates 110 and 120 may be obtained by processing an iron plate provided in a roll type in a desired shape. As such, as a roll type iron plate is used, a continuous process is possible, and thus, productivity may be increased.

In this state, the iron plate in use may be high tensile steel for a vehicle structure. When using high tensile steel for a vehicle structure, it is advantageous that a thin thickness may be employed and strength and a tensile force may be increased. First and second belt movement guide recess portions 111 and 121 are formed in the first and second anchor plates 110 and 120. The first and second belt movement guide recess portions 111 and 121 are formed through drawing processing to protrude from one side of the first and second anchor plates 110 and 120, and serve to guide the movement of the seat belt 40.

The drawing processing is a task to make a protruding portion of a hemispherical shape by pressing a flat iron plate from one side. The first and second belt movement guide recess portions 111 and 121 may be made through the first, second, third, and the like times of drawing processing. Of course, only the first drawing processing, or the second or more drawing processing, may be performed. This is a merely optional process, and the scope of rights of the present inventive concept is not limited to such frequencies.

When the first and second belt movement guide recess portions 111 and 121 manufactured as above are contacted and welded to each other, the cross-sections of the first and second belt movement guide recess portions 111 and 121 form an empty circular or cylindrical shape, which is advantageous to stably guide the seat belt 40. In the present embodiment, the first and second belt movement guide recess portions 111 and 121 form an oval structure of a closed loop.

For reference, as in the present embodiment, when the first and second belt movement guide recess portions 111 and 121 are formed in the first and second anchor plates 110 and 120, and integrated in one body to form a structure like an oval shape, a contact area with the seat belt 40 increases, and thus, surface shock in a vehicle collision or bump may be absorbed much. Accordingly, the stable operation of the seat belt 40 may be induced.

First and second belt passing holes 114 and 124 are formed inside the first and second belt movement guide recess portions 111 and 121 to penetrate the first and second belt movement guide recess portions 111 and 121. In other words, in both of the first and second anchor plates 110 and 120, the first and second belt passing holes 114 and 124, through which the seat belt 40 passes, are formed inside the first and second belt movement guide recess portions 111 and 121 to penetrate the first and second belt movement guide recess portions 111 and 121.

The first and second belt passing holes 114 and 124 may each have a long rectangular hole shape, and first and second belt guide ribs 116 and 126 are provided in the areas of the first and second belt passing holes 114 and 124.

The first and second belt guide ribs 116 and 126 have a shape of protruding toward the insides of the first and second belt passing holes 114 and 124. The first and second belt guide ribs 116 and 126 serve to prevent inversion of the seat belt 40 that passes through the first and second belt passing holes 114 and 124.

Of course, it is not necessary to form the first and second belt guide ribs 116 and 126, and thus, a pillar anchor (not shown) without the first and second belt guide ribs 116 and 126 may also be considered to be within the scope of rights of the present inventive concept.

First and second through-holes 115 and 125 are formed in one corner area of the first and second anchor plates 110 and 120. The first and second through-holes 115 and 125 form a place for fastening a bolt used to fix the pillar anchor 100 for an automobile to a vehicle body.

For reference, in the case of the pillar anchor 100 for an automobile according to the present embodiment, a portion where the first and second through-holes 115 and 125 are located has a structure bent forward or backward, which may be one solution to facilitate installation of the pillar anchor 100 for an automobile. Accordingly, when the pillar anchor 100 for an automobile may be installed well, there is no need to bend forward or backward the portion where the first and second through-holes 115 and 125 are located.

In the pillar anchor 100 for an automobile according to the present embodiment, the first and second reinforcement flanges 112 and 122 for reinforcement of the first and second anchor plates 110 and 120 are formed at edge portions of the first and second anchor plates 110 and 120.

The first and second reinforcement flanges 112 and 122, which are sort of overlays, are continuously arranged along the outer perimeters of the first and second belt movement guide recess portions 111 and 121, and serve to reinforce stiffness of the pillar anchor 100 for an automobile.

In detail, when a strong force to support a driver or occupant in a vehicle collision or bump is instantaneously concentrated on the pillar anchor 100 for an automobile in a direction A of FIG. 7 through the seat belt 40, in particular, the seat belt 40, if the first and second reinforcement flanges 112 and 122 are not present, the pillar anchor 100 for an automobile may be bent or damaged, and moreover, the seat belt 40 may be cut off which causes a very dangerous situation. However, in the case of the present embodiment, as the first and second reinforcement flanges 112 and 122 are applied to the pillar anchor 100 for an automobile, such drawbacks may be solved.

However, as in the present embodiment, when the first and second reinforcement flanges 112 and 122 are formed, the first and second reinforcement flanges 112 and 122 serve to reinforce strength so that a portion of the seat belt 40 that is contacted and pressed may be prevented from being bent or deformed. Accordingly, the durability of the pillar anchor 100 for an automobile may be increased so that a life span thereof may be extended.

In this state, the first and second reinforcement flanges 112 and 122 are not separated formed. In other words, when the first and second belt movement guide recess portions 111 and 121 are formed in the first and second anchor plates 110 and 120 through the drawing processing, by processing the first and second anchor plates 110 and 120 inwardly at a certain distance from the edges thereof, the first and second reinforcement flanges 112 and 122 may be naturally formed.

As described above, after individually manufactured, the first and second anchor plates 110 and 120 are welded, through welding, integrally in one body.

The welding may be spot welding as illustrated in FIG. 11. However, in addition to spot welding, other welding, for example, crimp welding and the like, may be employed, and it may be said that the above descriptions are all within the scope of rights of the present inventive concept. In other words, if it is not spot welding, various welding methods capable of welding the first and second anchor plates 110 and 120 may be employed. However, the spot welding is described as an example in the present embodiment.

When performing the spot welding, the first and second anchor plates 110 and 120 need to be accurately surface contacted with each other, so that welding quality is increased. To do so, it is necessary to temporarily assemble the first and second anchor plates 110 and 120 accurately without mismatch. To this end, the temporarily assembled portion 130 is provided in the first and second anchor plates 110 and 120.

The temporarily assembled portion 130 is a portion formed on the first and second anchor plates 110 and 120 to temporarily assemble the first and second anchor plates 110 and 120 before the first and second anchor plates 110 and 120 are spot welded. The temporarily assembled portion 130 may include at least one temporarily assembled protrusion 131 provided on one of the first and second anchor plates 110 and 120, and a temporarily assembled hole 132 provided in the other of the first and second anchor plates 110 and 120 and temporarily assembled with the temporarily assembled protrusion 131 at the opposite side.

In the present embodiment, while the temporarily assembled protrusion 131 is provided on the first anchor plate 110, the temporarily assembled hole 132 is provided in the second anchor plate 120.

However, the opposite is also possible. In other words, the temporarily assembled protrusion 131 and the temporarily assembled hole 132 may be provided on the second anchor plate 120 and the first anchor plate 110, respectively, and it may be said that the above descriptions are all within the scope of rights of the present inventive concept.

A method of manufacturing the pillar anchor 100 for an automobile by using the first and second anchor plates 110 and 120 is described below.

First, the first and second anchor plates 110 and 120 are prepared using metal, that is, high tensile steel for a vehicle structure (S11). The first and second anchor plates 110 and 120 before processing is provided in the form of a roll, which is appropriately cut for use.

Next, the first and second anchor plates 110 and 120 in a flat iron plate shape are drawing-processed to form the first and second belt movement guide recess portions 111 and 121 that protrude in the form of a hemisphere (S12). As described above, the drawing processing may be repeatedly performed as many as a desired number of times, for example, first, second, third, and the like.

When the first and second belt movement guide recess portions 111 and 121 are formed in the first and second anchor plates 110 and 120 through the drawing processing, the first and second reinforcement flanges 112 and 122 may be naturally formed on the edges of the first and second anchor plates 110 and 120. The first and second reinforcement flanges 112 and 122, which are overlays formed at the outsides of the first and second belt movement guide recess portions 111 and 121, may serve to reinforce the first and second anchor plates 110 and 120.

In this state, the reinforcement flanges 112 and 122 are continuously arranged along the outer perimeter of the first and second belt movement guide recess portions 111 and 121. Accordingly, it is very advantageous in reinforcement of the strength of the pillar anchor 100 for an automobile.

Next, an anchor plate additional processing operation (S13) is carried out. Through this operation, the temporarily assembled protrusion 131 may be processed on the first anchor plate 110, and the temporarily assembled hole 132 may be processed in the second anchor plate 120. In addition, the first and second belt passing holes 114 and 124, the first and second through-holes 115 and 125, and the like are formed in the first and second anchor plates 110 and 120.

As a result, elements formed on the first and second anchor plates 110 and 120, other than the first and second belt movement guide recess portions 111 and 121, may be formed through the anchor plate additional processing operation (S13).

For reference, in the case of the present embodiment, although the anchor plate additional processing operation (S13) is illustrated and described as being performed after the drawing processing operation (S12), the anchor plate additional processing operation (S13) may be performed before the drawing processing operation (S12), and it may be said that the above descriptions are all within the scope of rights of the present inventive concept.

Next, to remove burr that can be generated in the drawing processing operation, the first and second anchor plates 110 and 120 that have been drawing-processed are each barrel-polished (S14).

In particular, when burr exist in an area where the first and second belt passing holes 114 and 124 are in contact with the seat belt 40, in a process in which the seat belt 40 moves, it is highly likely that the seat belt 40 made of textile is worn out. Accordingly, barrel polishing is carried out to remove burr that can remain.

Of course, for the same effect, instead of barrel polishing, a lapping process is performed to process an area where the seat belt 40 passes, to be smooth, and it may also be said that the above descriptions are within the scope of rights of the present inventive concept. For reference, the lapping process refers to a task performed to remove machining marks after machining or process the surface roughness of a product exterior into a shiny surface like a mirror.

Next, the first and second anchor plates 110 and 120 are temporarily assembled by using the temporarily assembled portion 130, that is, the temporarily assembled protrusion 131 and the temporarily assembled hole 132, formed in a pair of first and second anchor plates 110 and 120 that have been barrel-polished (S15). Then, the first and second anchor plates 110 and 120 take a state of accurately contacting each other without mismatch.

Next, by contacting the first and second anchor plates 110 and 120 that are temporarily assembled and have surface contact with each other, and performing spot welding thereon (S16), the first and second anchor plates 110 and 120 are integrated in one body.

Then, a surface-contact region of a pair of the first and second anchor plates 110 and 120 that are integrated through spot welding is finishing-processed (S17).

Although barrel polishing is performed above, considering that burr may be generated again in the area of the first and second belt passing holes 114 and 124 due to the spot welding, a surface-contact region finishing processing operation is performed (S17). The surface-contact region refers to a region that is contacted and pressed by the seat belt 40. This operation may employ the lapping process described above.

However, the surface-contact region finishing processing operation (S17) may not be performed when the generation of burr is not anticipated.

For reference, to promote improvement of product quality and increase the value of a product, a heat treatment process, a surface processing process, or a plating process may be optionally performed before and after the operation S17.

According to the present embodiment configured and operated as described above, the pillar anchor 100 for an automobile may be easily manufactured in a simple structure compared with the related art, may exhibit high durability and light weight, and may be easily applied to electric vehicles and the like requiring lightweight parts. Of course, the present embodiment may be applied to general vehicles to reduce vehicle weight.

In particular, the reinforcement flanges 112 and 122 are provided in the pillar anchor 100 for an automobile, according to the present embodiment, to serve as a strong support, as described above, and thus, in a vehicle collision or bump, the pillar anchor 100 for an automobile may not be deformed even by a very strong shock and the seat belt 40 may be stably supported, thereby protecting a driver or occupant safe.

Figure 12:
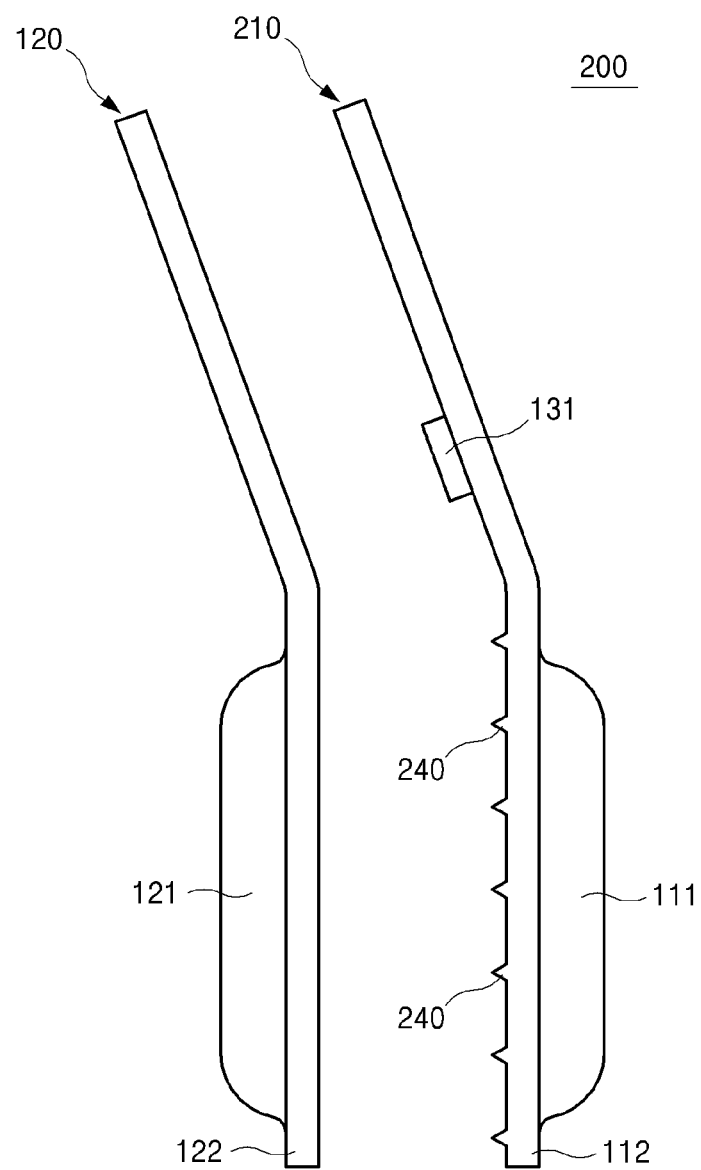
FIG. 12 is an exploded side view of a pillar anchor for an automobile, according to a second embodiment of the present inventive concept.

FIG. 12 is an exploded side view of a pillar anchor for an automobile, according to a second embodiment of the present inventive concept.

Referring to this drawing, a the pillar anchor 200 for an automobile according to the present embodiment may also include a pair of first and second anchor plates 210 and 120, and the first and second anchor plates 210 and 120 have a structure of being welded into one body through spot welding.

In the case of the present embodiment, a plurality of welding bead portions 240, each having a sharp tip end, are formed on at least any one of the first and second anchor plates 210 and 120.

As in the present embodiment, when the welding bead portions 240 are formed, during spot welding, as the welding bead portions 240 melt, the first and second anchor plates 210 and 120 may be more firmly coupled to each other. The welding bead portions 240 may be separately formed, or additionally formed in the anchor plate additional processing operation (S13), as described above.

Although, in the present embodiment, the welding bead portions 240 are formed on the first anchor plate 210, the welding bead portions 240 may be formed on the second anchor plate 120, or on both of the first and second anchor plates 210 and 120.

Figure 13:
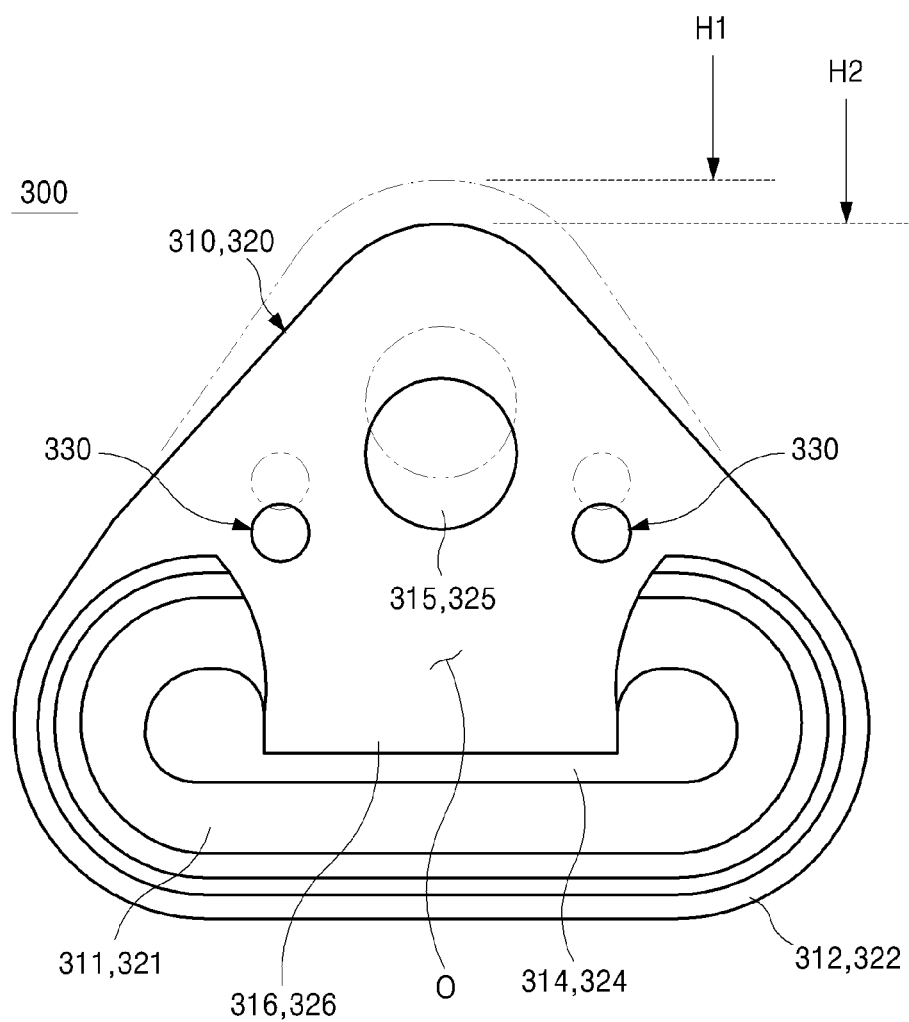
FIG. 13 is a front view of a pillar anchor for an automobile, according to a third embodiment of the present inventive concept.

FIG. 13 is a front view of a pillar anchor for an automobile, according to a third embodiment of the present inventive concept.

Referring to this drawing, a pillar anchor 300 for an automobile according to the present embodiment may also include a pair of first and second anchor plates 310 and 320, and the first and second anchor plates 310 and 320 have a structure of being welded into one body through spot welding.

First and second belt movement guide recess portions 311 and 321, first and second reinforcement flanges 312 and 322, first and second belt passing holes 314 and 324, first and second through-holes 315 and 325, first and second belt guide ribs 316 and 326, and a temporarily assembled portion 330 are formed by locations on the first and second anchor plates 310 and 320, and have the same configurations and operations as those of the embodiment described above. Accordingly, redundant descriptions thereof are omitted.

In the present embodiment, the first and second belt movement guide recess portions 311 and 321 have an open type oval structure with one open side, for example, a center, unlike the embodiment described above. In other words, an open portion O is formed at one side of the centers of the first and second belt movement guide recess portions 311 and 321.

For reference, as the seat belt 40 moves in contact with only a lower portion of each of the first and second belt movement guide recess portions 311 and 321, upper portions of the first and second belt movement guide recess portions 311 and 321 may not substantially serve any special function.

Accordingly, as in the present embodiment, when the first and second belt movement guide recess portions 311 and 321 are formed in an open type oval structure with one open side, not a closed loop, the open portion O may be formed in the central area of the first and second belt movement guide recess portions 311 and 321. Even when the first and second belt movement guide recess portions 311 and 321 are manufactured as above, there is no problem in the operation of the seat belt 40.

However, as in the present embodiment, when the open portion O is formed in the first and second belt movement guide recess portions 311 and 321, spot welding may be additionally performed in that portion so that more firm welding is possibly performed on the first and second anchor plates 310 and 320.

In addition, due to the open portion O, a total height (length) H2 of the pillar anchor 300 may be much reduced compared with the original height (length) H1 according to the related art.

This is possible because the side of the open portion O is empty, and thus, the first and second through-holes 315 and 325 and the temporarily assembled portion 330 may be located closer to the first and second belt movement guide recess portions 311 and 321.

As in the present embodiment, when the total height (length) H2 of the pillar anchor 300 is reduced by forming the open portion O in the first and second belt movement guide recess portions 311 and 321, material costs may be reduced accordingly, and furthermore, lightweight of parts may be available.

Figure 14:
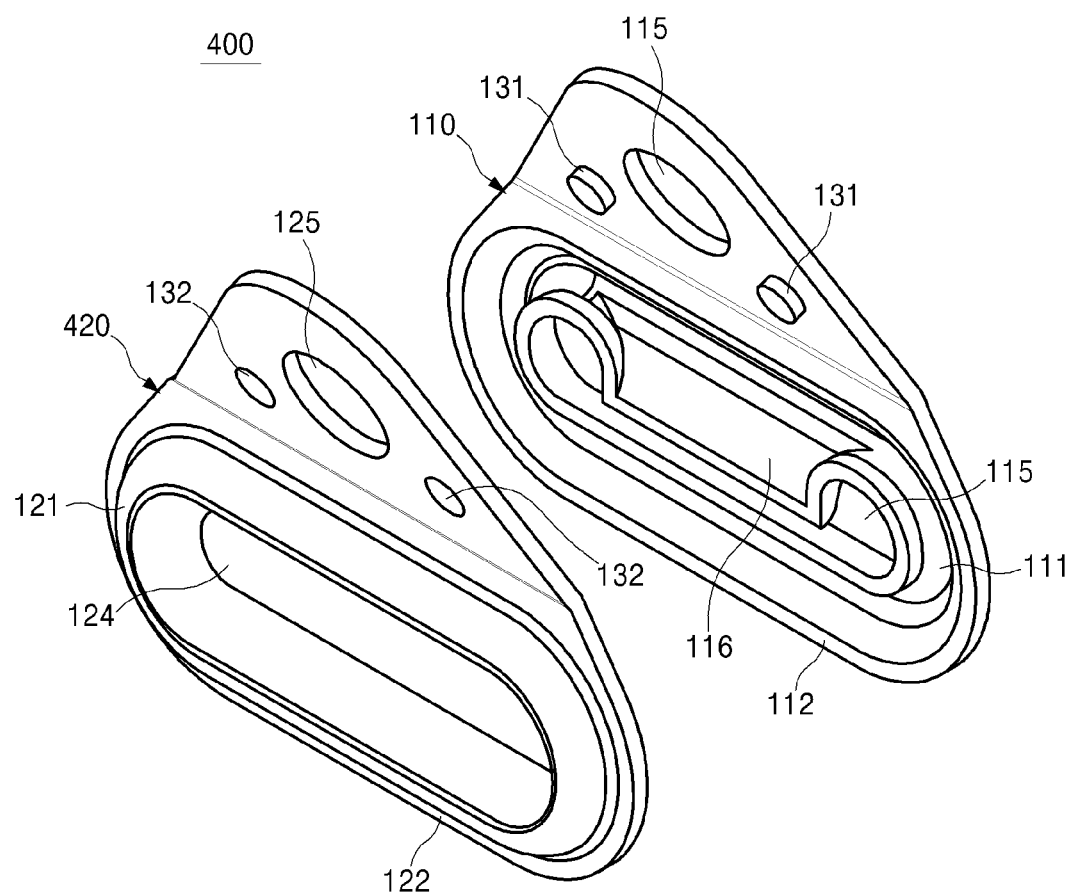
FIG. 14 is an exploded perspective view of a pillar anchor for an automobile, according to a fourth embodiment of the present inventive concept.

FIG. 14 is an exploded perspective view of a pillar anchor for an automobile, according to a fourth embodiment of the present inventive concept.

Referring to this drawing, a pillar anchor 400 for an automobile according to the present embodiment may also include a pair of first and second anchor plates 110 and 420, and the first and second anchor plates 110 and 420 have a structure of being welded into one body through spot welding.

The configurations of the first and second anchor plates 110 and 420 are substantially the same as those of the embodiments described above. However, in the present embodiment, the belt guide rib 126 (see FIG. 8) is not formed in the second anchor plate 420.

In other words, the belt guide rib 116 is formed only in the first anchor plate 110. Even when the second anchor plate 420 is manufactured as above, the effects of the present inventive concept may be provided.

As such, while the present inventive concept has been described with respect to specific embodiments thereof, it will be apparent to those skilled in the art that various changes and modifications may be made without departing from the spirit and scope of the invention as defined in the following claims.

INDUSTRIAL APPLICABILITY

The present inventive concept is industrially applicable in various fields including the vehicle field, in which belts are employed.

The invention claimed is:

1. A pillar anchor for an automobile, the pillar anchor comprising:
a pair of first and second anchor plates including metal, integrated in one body, and guiding a movement of a seat belt of a vehicle,
wherein each of the first and second anchor plates comprises:
a belt movement guide recess portion protruding toward one side of the first and second anchor plates through drawing processing, and guiding the movement of the seat belt; and
a reinforcement flange formed at edge portions of the first and second anchor plates to reinforce the first and second anchor plates,
wherein the reinforcement flange is continuously arranged along an outer perimeter of the belt movement guide recess portion.

2. The pillar anchor of claim 1, wherein the belt movement guide recess portion has an oval structure of a closed loop.

3. The pillar anchor of claim 1, wherein the belt movement guide recess portion has an open type oval structure with one open side and an open portion is formed in one side of the belt movement guide recess portion.

4. The pillar anchor of claim 1, wherein the first and second anchor plates comprise iron plates and each of the iron plates has high tensile steel for a vehicle structure, and the first and second anchor plates are formed in one body by welding.

5. The pillar anchor of claim 4, wherein a temporarily assembled portion is provided in the first and second anchor plates to temporarily assemble the first and second anchor plates before the first and second anchor plates are welded.

6. The pillar anchor of claim 5, wherein the temporarily assembled portion comprises:
at least one temporarily assembled protrusion provided on one of the first and second anchor plates; and
a temporarily assembled hole provided in the other of the first and second anchor plates, and temporarily assembled with a temporarily assembled protrusion at an opposite side.

7. The pillar anchor of claim 4, wherein a plurality of welding bead portions, each having a sharp tip end, are formed on at least any one of the first and second anchor plates.

8. The pillar anchor of claim 1, wherein, in both of the first and second anchor plates, a belt passing hole, through which the seat belt passes, is formed inside the belt movement guide recess portion to penetrate the belt movement guide recess portion, and a through-hole is formed at one side of the belt movement guide recess portion, and
a belt guide rib for preventing inversion of the seat belt protrudes in an area of the belt passing hole in at least any one of the first and second anchor plates.

9. A method of manufacturing a pillar anchor for an automobile, the method comprising:
an anchor plate preparation operation of preparing first and second anchor plates that are materials of the pillar anchor for an automobile, the material including metal; and
a drawing processing operation of drawing processing each of the first and second anchor plates to process a belt movement guide recess portion for guiding a movement of a seat belt of a vehicle connected to the pillar anchor for an automobile,
wherein, when the drawing processing operation is performed, a reinforcement flange for reinforcement of the first and second anchor plates is formed at edge portions of the first and second anchor plates outside the belt movement guide recess portion,
wherein, in the first and second anchor plates, the reinforcement flange is continuously arranged along an outer perimeter of the belt movement guide recess portion.

10. The method of claim 9, further comprising, after performing the drawing processing operation,
a barrel polishing operation of barrel polishing each of the first and second anchor plates that have been drawing-processed, to remove burr generated in the drawing processing operation.

11. The method of claim 10, further comprising, after performing the barrel polishing operation,
a welding operation of welding a pair of the first and second anchor plates that have been barrel-polished and contact each other.

12. The method of claim 11, further comprising, before or after performing the drawing processing operation,
an anchor plate additional processing operation of performing additional processing to form a belt passing hole, through which the seat belt passes, in the pair of the first and second anchor plates, while processing a temporarily assembled protrusion on the first anchor plate of the pair of the first and second anchor plates that have been drawing-processed and processing a temporarily assembled hole in the second anchor plate.

13. The method of claim 12, further comprising, before performing the welding,
a temporarily assembling operation of temporarily assembling the pair of the first and second anchor plates by using a temporarily assembled portion formed in the pair of the first and second anchor plates that have been barrel-polished.

14. The method of claim 11, further comprising a surface-contact region finishing processing operation of manufacturing the pillar anchor for an automobile by finishing-processing a surface-contact region of the pair of the first and second anchor plates that have been welded in one body.

* * * * *